(12) United States Patent
Lajus et al.

(10) Patent No.: US 9,926,390 B2
(45) Date of Patent: Mar. 27, 2018

(54) METHOD FOR PRODUCTION OF POLYMER

(71) Applicant: INEOS EUROPE AG, Rolle (CH)

(72) Inventors: Guillaume Lajus, Martigues (FR); Andrew David Bell, Carry-le-Rouet (FR)

(73) Assignee: INEOS EUROPE AG, Rolle (CH)

( * ) Notice: Subject to any disclaimer, the term of this patent is extended or adjusted under 35 U.S.C. 154(b) by 279 days.

(21) Appl. No.: 14/427,429

(22) PCT Filed: Sep. 24, 2013

(86) PCT No.: PCT/EP2013/069774
§ 371 (c)(1),
(2) Date: Mar. 11, 2015

(87) PCT Pub. No.: WO2014/048891
PCT Pub. Date: Apr. 3, 2014

(65) Prior Publication Data
US 2015/0246983 A1   Sep. 3, 2015

(30) Foreign Application Priority Data

Sep. 28, 2012 (EP) .................................... 12186516

(51) Int. Cl.
*C08F 10/14* (2006.01)
*C08F 2/34* (2006.01)
*C08F 2/38* (2006.01)
*C08F 210/16* (2006.01)
*B01J 8/18* (2006.01)
*C08F 2/00* (2006.01)
*B01J 8/24* (2006.01)

(52) U.S. Cl.
CPC ............. *C08F 10/14* (2013.01); *B01J 8/1809* (2013.01); *B01J 2208/00539* (2013.01); *B01J 2208/00548* (2013.01); *B01J 2208/00646* (2013.01); *B01J 2208/00716* (2013.01); *C08F 2400/02* (2013.01)

(58) Field of Classification Search
CPC ...... C08F 2/34; C08F 210/16; C08F 2400/02; C08F 2/38; B01J 8/1809; B01J 2208/00646; B01J 2208/00716
See application file for complete search history.

(56) References Cited

U.S. PATENT DOCUMENTS

| 5,306,792 A | 4/1994 | Havas et al. |
| 5,534,607 A † | 7/1996 | Martens |
| 5,627,242 A | 5/1997 | Jacobsen et al. |
| 6,348,635 B1 † | 2/2002 | Herzog |
| 2005/0085598 A1 | 4/2005 | Sandell et al. |
| 2005/0228543 A1 | 10/2005 | Parrish et al. |
| 2007/0060721 A1 | 3/2007 | Muhle et al. |
| 2011/0152484 A1 | 6/2011 | Chamayou et al. |

FOREIGN PATENT DOCUMENTS

| EP | 0 376 559 A1 | | 7/1990 |
| WO | 99/31142 | † | 6/1999 |
| WO | WO 99/31142 A1 | | 6/1999 |
| WO | WO 99/31143 A1 | | 6/1999 |
| WO | WO 01/30871 A1 | | 5/2001 |
| WO | WO 01/49751 A1 | | 7/2001 |
| WO | WO 02/50127 A2 | | 6/2002 |
| WO | 2008/030294 | † | 3/2008 |
| WO | WO 2008/030294 A1 | | 3/2008 |
| WO | WO 2008/076386 A1 | | 6/2008 |

OTHER PUBLICATIONS

Specification of Co-pending U.S. Appl. No. 14/427,492, filed Mar. 11, 2015, which is a National Phase PCT International Application No. PCT/EP2013/069775 (WO 2014/048892 A1), filed Sep. 24, 2013, 26 pgs.

† cited by third party

*Primary Examiner* — Fred M Teskin
(74) *Attorney, Agent, or Firm* — Nixon & Vanderhye P.C.

(57) ABSTRACT

Method for switching between steady-state and non-steady-state operations of a process for the production of a polymer by polymerization of a monomer in the presence of a comonomer and/or hydrogen. The process includes (a1) at non-steady-state controlling the process based on the ratio of comonomer to monomer in the reactor, and (b1) at steady-state controlling the process based on the flow ratio of comonomer to monomer to the reactor, and/or (a2) at non-steady-state controlling the process based on the ratio of hydrogen to monomer in the reactor, and (b2) at steady-state controlling the process based on the flow ratio of hydrogen to monomer to the reactor.

27 Claims, No Drawings

METHOD FOR PRODUCTION OF POLYMER

This application is the U.S. national phase of International Application No. PCT/EP2013/069774 filed Sep. 24, 2013 which designated the U.S. and claims priority to European Patent Application No. 12186516.6 filed Sep. 28, 2012, the entire contents of each of which are hereby incorporated by reference.

The present invention relates to the operation of a process for the production of a polymer by polymerisation of a monomer during steady-state and non-steady-state conditions.

BACKGROUND OF THE INVENTION

The polymerisation of olefin monomers in gas phase fluidised bed reactors is well-known. Control of such processes is required to ensure stable fluidisation and stable production of polymer with desired characteristics. As well as control during steady-state it is also important to control the process during periods of non-steady-state operation, such as during transitions and during start-ups.

At non-steady-state conditions it can be especially difficult to avoid the presence of off-specification material because it is especially difficult to control the density and melt index of polymer it is desired to produce.

A number of applications have attempted to address such problems during start-ups and at steady state.

WO 99/31143, for example, relates to a process for starting-up a polymerisation process in a gas phase fluidised bed which uses a catalyst based on chromium oxide. In the process described in this document the start-up involves two separate stages, the first in which olefin is introduced so as to maintain a constant partial pressure in the reactor, and the second in which olefin is introduced at a constant flow rate.

WO 99/31142 also relates to a process for starting-up a polymerisation process in a gas phase fluidised bed, but this time using a Ziegler-Natta type catalyst. In the process described in this document the start-up involves increases in the partial pressure of olefin and the rate of introduction of catalyst, whilst maintaining constant the ratios of the partial pressures of the olefin to hydrogen and to any comonomers.

WO 02/51027 relates to a start-up procedure for processes using at least two different catalyst compounds. The procedure involves calculating a trajectory, from elements including catalyst deactivation rate constants ($k_d$), for the rate of introduction of a catalyst system, into a reactor, and introducing the olefin monomer, a catalyst system, optional co-monomer, and optional chain transfer or termination agents into a polymerization reactor in a manner such that the catalyst system introduction rate is manipulated to follow the trajectory until a desired production rate is achieved.

U.S. Pat. No. 5,534,607 and U.S. Pat. No. 5,306,792 relate to operation of processes operating at steady state.

In particular, U.S. Pat. No. 5,534,607 relates to a continuous process for polymerisation of an alpha-olefin using a Ziegler-Natta type catalyst in which the reactor is fed with alpha-olefin at a constant rate and U.S. Pat. No. 5,306,792 relates to a continuous process for polymerisation of an alpha-olefin using a catalyst based on chromium oxide in which the reactor is fed with alpha-olefin and catalyst at constant rates.

DESCRIPTION OF THE INVENTION

An improved method has now been found for a polymerisation process where under non-steady-state condition the polymerisation process is operated to control the ratio of components in the reactor, but at steady-state the process is operated to control the flow ratio of components to the reactor.

Thus, in a first aspect, the present invention provides a method for switching between steady-state and non-steady-state operation of a process for the production of a polymer by polymerisation of a monomer in the presence of a comonomer and/or hydrogen which process comprises:

a. At non-steady-state controlling the process based on the ratio of comonomer to monomer in the reactor and/or based on the ratio of hydrogen to monomer in the reactor, and b. At steady-state controlling the process based on the flow ratio of comonomer to monomer to the reactor and/or based on the flow ratio of hydrogen to monomer to the reactor.

Generally, the control at both steady state and non-steady state is based on the same one of comonomer or hydrogen. Thus, when controlling the process based on the ratio of comonomer to monomer in the reactor at non steady-state then the process should be controlled based on the flow ratio of comonomer to monomer to the reactor at steady state, and similarly with hydrogen.

Thus, the present invention provides a method for switching between steady-state and non-steady-state operation of a process for the production of a polymer by polymerisation of a monomer in the presence of a comonomer and/or hydrogen which process comprises:

a1. At non-steady-state controlling the process based on the ratio of comonomer to monomer in the reactor, and b1. At steady-state controlling the process based on the flow ratio of comonomer to monomer to the reactor, and/or a2. At non-steady-state controlling the process based on the ratio of hydrogen to monomer in the reactor, and b2. At steady-state controlling the process based on the flow ratio of hydrogen to monomer to the reactor.

For avoidance of doubt, the present invention covers switching from steady-state to non-steady-state and the reverse i.e. from non-steady-state to steady-state.

The above respective controlling methods should each generally be applied during the majority of the time for which the process is in the respective steady-state or non-steady state operation, by which is meant in each case for at least 50% of the time during which the process is in the respective steady-state or non-steady state operation. Thus, controlling the process based on the ratio of comonomer to monomer in the reactor and/or based on the ratio of hydrogen to monomer in the reactor should be applied during at least 50% of the time during which the process is in a non-steady state. Similarly, controlling the process based on the flow ratio of comonomer to monomer to the reactor and/or based on the flow ratio of hydrogen to monomer to the reactor should be applied during at least 50% of the time during which the process is in a steady state.

In particular, it is possible to switch to controlling the process based on the ratio of comonomer to monomer in the reactor and/or based on the ratio of hydrogen to monomer in the reactor during steady-state operation if this is in anticipation of pending non-steady state operation, and in the reverse direction it is possible to switch to controlling the process based on the flow ratio of comonomer to monomer to the reactor and/or based on the flow ratio of hydrogen to monomer to the reactor during non-steady state operation if this is in anticipation of pending steady-state operation, but such periods should generally be relatively short compared to the times for which the respective steady-state and non-steady-state operations are usually operated.

It is therefore preferred that controlling the process based on the ratio of comonomer to monomer in the reactor and/or based on the ratio of hydrogen to monomer in the reactor is applied during at least 80%, and more preferably at least 90%, of the time during which the process is in a non-steady state. Similarly, it is preferred that controlling the process based on the flow ratio of comonomer to monomer to the reactor and/or based on the flow ratio of hydrogen to monomer to the reactor is applied during at least 80%, and more preferably at least 90%, of the time during which the process is in a steady state.

According to the present invention, the term "non-steady state" refers to periods/operation during which the production rate of polymer changes or the periods/operation during which the polymer properties of the polymer being produced change (mainly density or melt index or both).

In contrast, at "steady-state" the aim is to maintain a substantially constant hourly production of polymer and substantially constant properties of the polymer being made (in particular density and melt index).

It should be noted that the requirement for the hourly production of polymer to change during non-steady-state operation does not preclude relatively short periods during which production may be substantially constant. However, such periods are generally of a maximum of a few hours, whereas at "steady-state" a substantially constant hourly production of polymer will generally be maintained for a number of days, such as for at least 1 day, more usually as least 3 days, and often significantly longer.

In contrast, the total duration of a non-steady-state period is generally from a few hours to less than 3 days.

The term "substantially constant" as used herein means that a parameter varies by less than +/−10% from an average over a period of time. In relation to "non-steady-state" this period of time is the non-steady-state period, whereas in relation to "steady-state" a period of 1 day can be used. More generally, a control system may act to try to maintain a parameter at a particular value, but variations of the parameter from the set point may occur due to noise in measurements and/or delays in response of the control system, but such control is still "steady-state".

According to the process of the present invention, "controlling the process based on" means that the process is operated at a particular time to obtain a desired value of the defined parameter. Further, for avoidance of any doubt, "controlling the process based on" a ratio of a hydrogen or comonomer component to monomer requires that said component is present i.e. the comonomer or hydrogen must be present in the reactor or fed to the reactor in order for it to be controlled as defined herein. Thus, when the control is based on a ratio in the reactor, the process is controlled at any moment to try to obtain a desired ratio in the reactor. (It should be noted that the desired ratio may in itself change with time, for example during a transition, in which case the process control will act to try to obtain the changed ratio.) Similarly, when the control is based on a flow ratio to the reactor the process is controlled at any moment to try to obtain a desired flow ratio to the reactor.

Usually such control involves determining the actual value of a defined parameter, comparing this to a desired value, and where the actual value deviates from the desired value taking one or more actions to bring the actual value into line with the desired value.

Steady-State Operation

According to the present invention, at steady-state the process is controlled based on the flow ratio of comonomer to monomer to the reactor and/or based on the flow ratio of hydrogen to monomer to the reactor.

Since at steady state it is desired to maintain substantially constant properties of the polymer being made, this generally means that there is maintained a substantially constant flow ratio of comonomer to monomer and/or a substantially constant flow ratio of hydrogen to monomer.

Both flow ratios are generally maintained substantially constant when both comonomer and hydrogen are fed to the reactor.

Under such control, the comonomer and/or hydrogen partial pressures in the reactor are not directly controlled and therefore may vary (e.g. due to changes in catalyst activity or feed stock purity for example).

As already noted, at steady state it is generally desired to maintain a substantially constant hourly production of polymer. According to one embodiment, this can be achieved by maintaining the monomer partial pressure in the reactor substantially constant.

However, maintaining the monomer partial pressure substantially constant is not required to maintain substantially constant production, and in alternative embodiments the monomer partial pressure in the reactor may vary. As an example, the process may be operated to maintain a substantially constant flow rate of fresh monomer at steady-state, and this will generally also maintain essentially constant production. (The production rate may vary with such control but generally will do so by less than 10%.)

In one embodiment the total flows of monomer, comonomer and hydrogen to the reactor may be used to determine the flow ratios which are used for the process control. The "total" flows include fresh flows and recycle flows of the respective components.

In a preferred embodiment the flow ratio used is the flow ratio of fresh feeds. Thus, the "flow ratio of comonomer to monomer" used in the present invention is preferably the flow ratio of the feed of fresh comonomer to the feed of fresh monomer and the "flow ratio of hydrogen to monomer" used in the present invention is preferably the flow ratio of the feed of fresh hydrogen to the feed of fresh monomer.

Non-Steady-State Operation

According to the present invention, at non-steady-state the process is controlled based on the ratio of comonomer to monomer in the reactor and/or based on the ratio of hydrogen to monomer in the reactor. Any suitable ratio which can represent the relative amounts of comonomer to monomer and/or of hydrogen to monomer in the reactor can be used, such as a molar ratio, a volume ratio, a weight ratio, or even a "mixed" ratio.

During a polymerisation reaction, growing particles of polymer are formed in the reactor zone, which particles comprise amorphous regions which exhibit a liquid-like structure and ordered crystalline regions called crystallites. Quantities of monomer, comonomer, hydrogen and other gas phase components can be absorbed on the polymer particles (in the amorphous phase). It is thus possible to control using a ratio based on one or more of (i) the amount of monomer absorbed on the polymer particles in the reactor, (ii) the amount of comonomer absorbed on the polymer particles in the reactor and (iii) the amount of hydrogen absorbed on the polymer particles in the reactor, However, it is preferred that the process of the present invention is controlled at non-steady-state based on the ratio of comonomer in the gas phase in the reactor to monomer in the gas phase in the reactor and/or based on the ratio of hydrogen in the gas phase in the reactor to monomer in the gas phase in the reactor. The control is most preferably based on the ratio of comonomer to monomer partial pressures in the reactor and/or based on the ratio of hydrogen to monomer partial pressures in the reactor, by which is meant that ratio of comonomer partial pressure in the gas phase in the reactor to monomer partial pressure in the gas phase in the reactor and/or based on the ratio of hydrogen partial pressure in the gas phase in the reactor to monomer partial pressure in the gas phase in the reactor. Reference may hereinafter be made to the use of partial pressure ratios, but it should be noted that other equivalent ratios, such as the molar ratios, may be used.

Examples of non-steady-state operation include start-up, process upsets and transitions.

The preferred operation depends on the particular non-steady-state scenario.

1. Start-Up

As one example, the present invention may be applied to a start-up (and subsequent operation). During start-up it is generally desired to maintain the ratio of comonomer to monomer partial pressures in the reactor and/or the ratio of hydrogen to monomer partial pressures in the reactor at substantially constant ratios. It is also generally desired to maintain a substantially constant monomer partial pressure. Thus, the present invention may maintain the monomer partial pressure, and either or both of the comonomer and hydrogen partial pressures substantially constant during the start-up, and then switch to flow ratio control once steady state is achieved.

More specifically, and as a second aspect, the present invention provides a method for the start-up and subsequent operation of a process for the production of a polymer by polymerisation of a monomer in the presence of a comonomer and/or hydrogen which process comprises:

a. During start-up controlling the process to maintain the ratio of comonomer to monomer partial pressures in the reactor substantially constant and/or controlling the process to maintain the ratio of hydrogen to monomer partial pressures in the reactor substantially constant b. At steady-state controlling the process to maintain a substantially constant flow ratio of comonomer to monomer and/or a substantially constant flow ratio of hydrogen to monomer.

As with the first aspect, generally the control at both steady state and non-steady state in the second aspect is based on the same one of comonomer or hydrogen. In particular, the second aspect of the present invention then provides a method for the start-up and subsequent operation of a process for the production of a polymer by polymerisation of a monomer in the presence of a comonomer and/or hydrogen which process comprises:

a1. During start-up controlling the process to maintain the ratio of comonomer to monomer partial pressures in the reactor substantially constant, and b1. At steady-state controlling the process to maintain a substantially constant flow ratio of comonomer to monomer, and/or a2. During start-up controlling the process to maintain the ratio of hydrogen to monomer partial pressures in the reactor substantially constant, and b2. At steady-state controlling the process to maintain a substantially constant flow ratio of hydrogen to monomer.

According to the present invention, and as in the art noted above, the term "start-up" refers to the period which passes between the time at which the introduction of the catalyst into the reactor is begun and the time at which a steady desired hourly production of polymer of substantially constant properties is reached ("steady state").

In general, prior to catalyst injection i.e. prior to a start-up period, the reactor is heated to an elevated temperature, pressurised to an elevated pressure, and the reaction composition adjusted to have the desired partial pressures of the monomer, any comonomer, any hydrogen and any other species present.

The temperature and pressure are usually at or close to the desired steady-state reaction temperature and pressure. Similarly the partial pressures of the monomer and any comonomer and/or hydrogen during start-up are usually at or close to the desired steady-state values.

The gas mixture is passed through and fluidises a "start-up bed" of polymer, usually a bed of deactivated polymer particles from a previous reaction.

Catalyst in then injected to initiate reaction, which step marks the start of the "start-up" period.

During start-up the hourly production of polymer is increased to the desired steady-state production rate.

As already noted more generally, it should be noted that the increase in the hourly production of polymer during the start-up phase does not preclude relatively short periods during start-up during which production may be substantially constant. Such is described, for example, in WO 99/31142. However, such periods are generally short compared to "steady-state". In particular, the total duration, T, of the start-up period is generally less than 3 days, with any periods of substantially constant production during start-up being significantly shorter still, and in particular of a few hours, such as of 6 hours or less.

The actual total duration, T, of the start-up period can vary according to the size of the reactor. With industrial-scale reactors, it is usually between 1 hour and 3 days, preferably between 10 and 48 hours.

As already noted, the term "substantially constant" as used herein means that a parameter varies by less than +/−10% from an average over a period of time. In relation to "start-up" this period of time is the start-up period.

The start-up period can advantageously be preceded by one or more purification periods, during which the reactor is freed as far as possible from impurities, such as oxygen or water, which poison the catalyst. The purification of the reactor can be carried out as indicated in European Patent Application EP-A-0180420.

2. Transitioning

As a second example of a non-steady-state operation, the present invention may be applied to a transition. During a transition it is generally desired to change from one set of steady-state operations to a different set of steady-state operations. The period during which this change takes place is referred to as the transition, and is a period of non-steady-state operation whilst reaction conditions change.

A number of different transitioning strategies are known in the art, but the present invention is generally applicable to what are referred to as "continuous transitions", which are transitions where polymer continues to be produced during the transition. Most preferably, the transition involves a change in the ratio of comonomer to monomer partial pressures in the reactor and/or a change in the ratio of hydrogen to monomer partial pressures in the reactor, and often both.

Generally, at (or close to) the start of a transition the control is switched from control based on flow ratios (steady-state control) to control based on ratios in the reactor. The ratios are generally adjusted during the transition to those required for the subsequent product. Thus the control based on the ratio of comonomer to monomer partial pressures and/or control based on the ratio of hydrogen to monomer partial pressures generally involves adjusting these ratios from initial values to final values during the transition. This may be achieved as a step-change in the required ratios during the transition (usually at the beginning in this case) or a ramp from the initial to the final values. Transitioning strategies can also involve overshoots in the desired values to enable a more rapid transition.

Once at the "final" values the process of the present invention maintains control based on these ratio(s) until the new steady-state is obtained, and the control is switched back to control based on flow ratio(s) for steady state operation.

It is possible, and preferred, to maintain a substantially constant monomer partial pressure during the transition.

More generally, and preferably, the present invention controls the process based on both the ratio of comonomer to monomer in the reactor and the ratio of hydrogen to monomer in the reactor at non-steady state and controls the process based on both the flow ratio of comonomer to monomer to the reactor and the flow ratio of hydrogen to monomer to the reactor at steady-state.

The control and/or the switching present invention may be operated manually by an operator, but is more usually, and advantageously, operated using a computerised process control system.

As used herein, and as used in conventional process control terminology, a parameter (or variable) which it is desired to control or maintain at a defined value (set-point) may be referred to as a "controlled variable".

For example, in steady-state operation according to the present invention the flow ratio of comonomer to monomer and/or the flow ratio of hydrogen to monomer would generally be used as controlled variables. In non-steady state operation according to the present invention the ratios of comonomer to monomer partial pressures and hydrogen to monomer partial pressures would generally be used as controlled variables. Equally, however, parameters which result in the same effect as required by the present invention may instead be used as "controlled variables". For example, instead of the ratio of partial pressure of comonomer to monomer being a controlled variable, where the partial pressure of monomer is constant then the partial pressure of comonomer in the reactor could be used, and will give the same result (i.e. control/maintenance of the partial pressure ratio).

A parameter (or variable) which is manipulated to control the controlled variable is referred to as a "manipulated variable". Any suitable parameters which allow control of the relevant controlled variable may be used as manipulated variables. Specific examples include the feed rates of the relevant feeds.

Thus, at steady-state, the fresh feed rates of the relevant feeds will generally be manipulated variables and will be adjusted/manipulated to maintain the substantially constant flow ratios.

Similarly, at non-steady state, the fresh monomer feed rate may be used as a manipulated variable to maintain monomer partial pressure, the fresh comonomer feed rate may be used as a manipulated variable to maintain comonomer partial pressure, and the fresh hydrogen feed rate may be used as a manipulated variable to maintain hydrogen partial pressure, and thereby used to maintain partial pressure ratios.

It will be apparent that the same manipulated variables may be used at both steady-state and non-steady-state according to the present invention, but the controlled variable which they are adjusted to maintain is changed.

Generally during the start-up or any other period of non-steady-state operation, the partial pressures of monomer, comonomer and/or hydrogen in the reactor are monitored, and fresh monomer, fresh comonomer and/or fresh hydrogen are fed to the reactor to replace the monomer, comonomer and/or hydrogen consumed (by reaction to produce polymer) and thereby maintain the desired partial pressure ratio(s).

The changes in production rate during the period of non-steady-state operation depend on the operation. Usually during a start-up period the production rate is increased, for example by increasing the rate of catalyst introduction. Where it is desired to maintain constant partial pressures, for example, the rates of feed for the fresh feeds need to increase during the start-up. In contrast, for a transition the production rate may initially be reduced from a first steady-state operation, and subsequently increased to a subsequent steady-state operation towards the end of the transition.

Similarly, during the period of non-steady-state operation the height of the fluidized bed may be substantially the same as that at steady-state, in which case the height of the bed is substantially constant throughout the process. Alternatively, the height of the bed can be changed during the non-steady-state operation. For example, for a transition the bed height may initially be reduced, and subsequently increased towards the end of the transition. For start-up, the reaction can be started with a lower bed and the height of the bed can be increased during the start-up period, as described in WO 99/31142.

Similarly, the fluidisation velocity of the gas mixture may be substantially constant during the non-steady-state period, or the velocity may be varied. For example, on a start-up the velocity may initially be lower than desired at steady-state, and be increased during the start-up period.

In general, the monitoring of the partial pressures can be performed by any suitable technique. The use of gas chromatographs is widely used, and is preferred.

The present invention is based on the fact that such control at steady-state based on flow ratios has been found to be simpler and also more reliable than control based on partial pressures of components in the reactor.

In particular, whilst gas chromatographs are widely used to determine gas phase partial pressures (and thereby to control/maintain such pressures), over long periods of time, such as those operated at steady-state, the measurements can drift, and hence the control of the process based on controlling partial pressure ratios can become unreliable. Further the steady state concentrations of comonomer and hydrogen can be relatively low in certain polymerisation reactions, which makes their accurate determination difficult, and adds corresponding error to the control. For comonomers, such components are usually also difficult to distinguish from similar molecular weight components (e.g. 1-hexene from 2-hexene and hexane), which makes separation difficult unless a longer separation column is installed in the analyser, but which leads to a long response time.

In particular, it has been found that polymer density, which is dependent on the ratio of comonomer to monomer, can drift significantly from the value desired when using control of the partial pressure ratio over relatively long periods of time. In contrast, the control based on flow ratio ensures a steady ratio of comonomer to monomer is fed to the reactor. Even if the gas chromatograph does become imprecise, if a constant comonomer to monomer ratio is generally fed to the process the ratio also reaches a steady state in the reactor, and the density does not vary significantly.

In contrast, at non-steady-state conditions the reactor composition does not reach a steady-state even with a constant flow ratio, but can vary significantly. Flow ratio control then becomes less accurate as a means to ensure the desired properties. In such scenarios the use of control based on partial pressure ratio of comonomer and monomer and/or hydrogen and monomer is more accurate. Although some of the difficulties associated with the use of gas chromatographs remain, such scenarios usually occur for relatively short time periods, and the potential problems with gas chromatographs over longer periods of time are not of a concern.

The polymerization is preferably carried out in a gas phase fluidized-bed reactor. Such reactors/processes are generally known. Examples are described in French Patent No. 2,207,145 or French Patent No. 2,335,526.

The monomer is generally an olefin having from 2 to 10 carbon atoms. The comonomer may also be an olefin (other than the monomer) having from 2 to 10 carbon atoms, or may be a diene having from 2 to 10 carbon atoms.

As used herein, the term "monomer" refers to the monomer present in the reaction at the highest partial pressure, and the term "comonomer" refers to a monomer present at a lower partial pressure. Preferred monomers are ethylene and propylene, most preferably ethylene. Preferred comonomers are olefins having 4 to 8 carbon atoms, although ethylene may be a comonomer where propylene is the monomer, and vice versa.

Catalyst may be introduced into the reactor continuously or discontinuously. Catalyst can be introduced in particular using the equipment described in French Patent No. 2,562,077 or in French Patent No. 2,705,252. During a transition the catalyst may be changed.

The present invention may be applied to any suitable polymerisation catalyst, but is preferably applied to a process using a Ziegler-Natta type catalyst.

A Ziegler-Natta type catalyst is understood to mean a catalyst which comprises at least one transition metal chosen, for example, from titanium, vanadium, chromium, zirconium or hafnium. This catalyst can optionally comprise a magnesium halide, such as magnesium chloride or bromide, and/or a support based on a refractory oxide, such as silica or alumina. In particular a catalyst comprising titanium and/or vanadium, halogen and magnesium atoms can be used.

It is also possible to use a metallocene-based catalyst comprising at least one zirconium, titanium or hafnium atom, such as, for example, those described in EP 129368, U.S. Pat. No. 5,324,800 and EP 206794. It is also possible to use a catalyst containing a heteroatom bonded to a monocyclopentadienyl, such as, for example, the catalysts described in EP 416815 and EP 420436.

The catalyst is in principle used in conjunction with a cocatalyst which is an organometallic compound of a metal from Groups I to III of the Periodic Classification of the Elements, such as aluminium, boron, zinc or magnesium. For example, the cocatalyst can be an organoaluminium compound, such as a trialkylaluminium or an aluminoxane. Throughout the start-up period, the introduction of cocatalyst into the reactor is advantageously carried out so as to keep the cocatalyst to catalyst molar ratio constant. This ratio is preferably between 1 and 100 moles of cocatalyst per mole of transition metal in the catalyst. However, when a metallocene catalyst is used, this ratio can range from 1:10,000 to 10,000:1 moles of cocatalyst per mole of transition metal in the catalyst.

The catalyst can be used as is or optionally in the form of a prepolymer containing, for example, from 0.1 to 200 g, preferably from 10 to 100 g, of polymer per gram of transition metal. The process of the invention is particularly suited to the use of a non-prepolymerised catalyst.

The present invention is particularly applicable to polyethylene copolymer grades of low and medium density, which generally means products with densities in the range 890-940 kg/m$^3$. The present invention is in particular applicable to densities in the range 900-940 kg/m$^3$ for Ziegler products and in the range 890-930 kg/m$^3$ for metallocene products. As used herein, densities are non-annealed densities of the polymer as measured using method ISO 1183 A.

The reaction gas mixture may generally also contain an inert gas, which is generally nitrogen and/or an alkane, for example having from 1 to 8, preferably from 2 to 6, carbon atoms, such as pentane and/or isopentane.

The space time yield, which is the hourly production of polymer per unit volume of the reactor, is relatively low at the beginning of the start-up period, but increases throughout the start-up period to reach a final value at steady state which is generally in the range 50 to 200 kg/h/m$^3$.

Generally, the total pressure in the reactor at steady-state is between 0.5 and 5 MPa, preferably between 1.5 and 2.5 MPa.

The partial pressure of monomer at steady-state is generally between 0.3 and 1.5 MPa, preferably between 0.4 and 1.3 MPa.

The partial pressure of comonomer at steady-state is generally between 0 and 0.7 MPa, preferably between 0 and 0.5 MPa for Ziegler catalyst operation, preferably between 0 and 0.02 MPa for chromium operation and preferably between 0.005 and 0.02 MPa for metallocene operation.

The temperature at steady-state can generally range from 30° to 180° C., preferably from 90° to 120° C.

The fluidization velocity at steady-state rate can generally range from 45 to 80 cm/s. If a lower velocity is used at start-up then this may be in the range from 35 to 50 cm/s.

The process of the invention is particularly well suited to industrial-scale reactors of very large size which can have an hourly production of at least 10 tonnes of polymer. The reaction gas mixture containing the monomer and comonomer to be polymerized is generally cooled by means of at least one heat exchanger arranged outside the reactor before being recycled. Following the start-up period, the polymerization reaction is advantageously carried out as indicated in French Patent No. 2,666,337.

EXAMPLE

An HDPE grade of non-annealed density 958 kg/m$^3$ and MI$_{2.16}$ of 7 is being produced on an industrial gas phase reactor of diameter 5 m and bed height 20 m at a rate of 40 Te/h. During the steady state production of this grade, the reactor is controlled on flow ratio. In particular, the hexene flow rate and the hydrogen flow rate are the manipulated variables used to maintain the controlled variables which are the flow ratio of hexene to ethylene and the flow ratio of hydrogen to ethylene.

At the end of the campaign, the plant transitions to an LLDPE grade of non-annealed density 918 kg/m$^3$ and MI$_{2.16}$ of 0.9. The comonomer to ethylene flow ratio required to produce this product of lower density is higher than the one required for the initial HDPE grade. However, if a ramp of the flow ratio set point was simply implemented the transition would take too much time since the gas phase ratio of hexene to ethylene required to produce the new lower density grade is also much higher than the initial one (typically an increase of PC6/PC2 from 0.01 to 0.17). This means that the loop hexene inventory has to be significantly increased and that the transitory comonomer flow rate should be much higher than the one that would be calculated by a simple proportional ramp on the flow ratios.

The reactor process control is therefore switched during the transition to manipulating both the fresh hexene and fresh ethylene feed rates to control the partial pressures of each and the partial pressure ratio of the two in the reactor.

Similarly, the fresh hydrogen feed to the reactor has to be decreased during the transition to produce a polymer of lower MI. However a simple ramp on the flow ratio of hydrogen to ethylene would lead to a very long transition since the reactor hydrogen has also to be de inventoried. Therefore during the transition the reactor control is changed to manipulating the fresh hydrogen to control the partial pressure of hydrogen and the partial pressure ratio of fresh hydrogen to fresh ethylene in the reactor.

At the end of the transition, when the gas phase ratios required to produce the new grade have been established, the reactor control is changed back to the flow ratio control.

The invention claimed is:

1. A method for switching between steady-state and non-steady-state operation of a process for the production of a polymer by polymerisation of a monomer in the presence of a comonomer and/or hydrogen which process comprises:
   a. At non-steady state controlling the process based on both the ratio of comonomer to monomer partial pressures in the reactor and the ratio of hydrogen to monomer partial pressures in the reactor, and
   b. At steady state controlling the process based on both the flow ratio of comonomer to monomer to the reactor and the flow ratio of hydrogen to monomer to the reactor.

2. A method according to claim 1 wherein at steady state there is maintained a substantially constant flow ratio of comonomer to monomer and/or a substantially constant flow ratio of hydrogen to monomer.

3. A method according to claim 1 wherein at steady state the monomer partial pressure in the reactor is maintained substantially constant.

4. A method according to claim 1 wherein at steady state the flow rate of fresh monomer to the reactor is maintained substantially constant.

5. A method according to claim 1 wherein the non-steady-state is a start-up.

6. A method according to claim 5 wherein during start-up the ratio of comonomer to monomer partial pressures in the reactor and/or the ratio of hydrogen to monomer partial pressures in the reactor are maintained substantially constant.

7. A method according to claim 5 wherein during start-up the monomer partial pressure in the reactor is maintained substantially constant.

8. A method for the start-up and subsequent operation of a process for the production of a polymer by polymerisation of a monomer in the presence of a comonomer and/or hydrogen which process comprises:
   a. During start-up controlling the process based on both the ratio of comonomer to monomer partial pressures in the reactor and the ratio of hydrogen to monomer partial pressures in the reactor and
   b. At steady state controlling the process based on both the flow ratio of comonomer to monomer to the reactor and the flow ratio of hydrogen to monomer to the reactor.

9. A method according to claim 1 wherein the non-steady-state is a transition.

10. A method according to claim 9 wherein during the transition the ratio of comonomer to monomer partial pressures in the reactor and/or the ratio of hydrogen to monomer partial pressures in the reactor are varied.

11. A method according to claim 9 wherein during the transition the monomer partial pressure in the reactor is maintained substantially constant.

12. A method according to claim 1 which is carried out in a gas phase fluidized-bed reactor.

13. A method according to claim 1 wherein the total pressure in the reactor at steady-state is between 0.5 and 5 MPa and the partial pressure of monomer at steady-state is between 0.3 and 1.5 MPa.

14. A method according to claim 1 wherein the monomer is ethylene or propylene.

15. A method according to claim 8 which is carried out in a gas phase fluidized-bed reactor.

16. A method according to claim 8 wherein the total pressure in the reactor at steady-state is between 0.5 and 5 MPa and the partial pressure of monomer at steady-state is between 0.3 and 1.5 MPa.

17. A method according to claim 8 wherein the monomer is ethylene or propylene.

18. A method for switching between steady-state and non-steady-state operation of a process for the production of a polymer by polymerisation of a monomer in the presence of a comonomer and/or hydrogen which process comprises:
   a1. At non-steady-state controlling the process based on the ratio of comonomer to monomer in the reactor, and
   b1. At steady-state controlling the process based on the flow ratio of comonomer to monomer to the reactor, and/or
   a2. At non-steady-state controlling the process based on the ratio of hydrogen to monomer in the reactor, and
   b2. At steady-state controlling the process based on the flow ratio of hydrogen to monomer to the reactor, and further wherein at steady state the monomer partial pressure in the reactor is maintained substantially constant.

19. A method according to claim 18 wherein the non-steady-state is a start-up.

20. A method according to claim 19 wherein during start-up the ratio of comonomer to monomer partial pressures in the reactor and/or the ratio of hydrogen to monomer partial pressures in the reactor are maintained substantially constant.

21. A method according to claim 19 wherein during start-up the monomer partial pressure in the reactor is maintained substantially constant.

22. A method according to claim 18 wherein the non-steady-state is a transition.

23. A method according to claim 22 wherein during the transition the ratio of comonomer to monomer partial pressures in the reactor and/or the ratio of hydrogen to monomer partial pressures in the reactor are varied.

24. A method according to claim 22 wherein during the transition the monomer partial pressure in the reactor is maintained substantially constant.

25. A method according to claim 18 which is carried out in a gas phase fluidized-bed reactor.

26. A method according to claim 18 wherein the total pressure in the reactor at steady-state is between 0.5 and 5 MPa and the partial pressure of monomer at steady-state is between 0.3 and 1.5 MPa.

27. A method according to claim 18 wherein the monomer is ethylene or propylene.

* * * * *